(12) United States Patent (10) Patent No.: US 7,522,033 B2
Takamoto et al. (45) Date of Patent: Apr. 21, 2009

(54) SIGNAL GENERATING APPARATUS FOR A BICYCLE CONTROL DEVICE

(75) Inventors: Ryuichiro Takamoto, Sakai (JP); Satoshi Kitamura, Kitakatsuragi-gun (JP); Toshikuni Suzuki, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 221 days.

(21) Appl. No.: 11/161,232

(22) Filed: Jul. 27, 2005

(65) Prior Publication Data

US 2007/0024435 A1 Feb. 1, 2007

(51) Int. Cl.
*B60Q 1/00* (2006.01)

(52) U.S. Cl. ............... 340/456; 340/425.5; 340/432; 474/70; 474/110

(58) Field of Classification Search ............ 340/425.5, 340/432, 438, 456; 474/70, 110
See application file for complete search history.

(56) References Cited

U.S. PATENT DOCUMENTS

| 4,490,137 | A | * | 12/1984 | Moukheibir | ............ | 604/28 |
| 5,357,177 | A | | 10/1994 | Fey et al. | ............ | 318/3 |
| 5,483,137 | A | | 1/1996 | Fey et al. | ............ | 318/560 |
| 6,274,299 | B1 | * | 8/2001 | Buhr et al. | ............ | 430/359 |
| 6,722,220 | B2 | * | 4/2004 | Takeda | ............ | 74/335 |
| 6,724,299 | B2 | | 4/2004 | Takeda et al. | ............ | 340/432 |
| 6,741,045 | B2 | | 5/2004 | Kitamura | ............ | 318/14 |
| 6,877,755 | B2 | * | 4/2005 | Takamoto | ............ | 280/260 |
| 7,116,008 | B2 | * | 10/2006 | Kitamura et al. | ............ | 307/9.1 |

FOREIGN PATENT DOCUMENTS

| EP | 1295786 A2 | 3/2003 |
| EP | 1359088 A2 | 11/2003 |
| JP | 62-135032 A | 6/1987 |
| WO | 01/14203 A1 | 3/2001 |

OTHER PUBLICATIONS

European search report for EP 06015593.4, the European application that corresponds to this application, dated Jun. 4, 2007.
European search report for EP 06015593.4, the European application that corresponds to this application, dated Jul. 13, 2007.

* cited by examiner

*Primary Examiner*—George A Bugg
*Assistant Examiner*—Edny Labbees
(74) *Attorney, Agent, or Firm*—James A. Deland (57) ABSTRACT

A bicycle signal generating apparatus comprises an input unit and a signal generating unit. The input unit receives a first input signal and a second input signal, wherein the first input signal corresponds to a first operation of a bicycle device and the second input signal corresponds to a second operation of the bicycle device. The signal generating unit generates a first output signal having a first pattern from the first input signal, and the signal generating unit generates a second output signal having a second pattern from the second input signal. The first pattern is different from the second pattern.

31 Claims, 7 Drawing Sheets

SIGNAL GENERATING APPARATUS FOR A BICYCLE CONTROL DEVICE

BACKGROUND OF THE INVENTION

The present invention is directed to bicycles and, more particularly, to various features of an apparatus for controlling a bicycle device.

Bicycle devices that are operated by an electric motor or the like recently have become known. For example, the rider may manually operate an electric switch, and the signal produced by the switch may be used to operate a motor that upshifts or downshifts the bicycle transmission accordingly.

One known bicycle transmission control device includes separate upshift and downshift switches that are separately wired to their corresponding derailleur control units. Such a system increases the amount of hardware that must be mounted to the bicycle. Other known bicycle transmissions include a single wire that carries the electrical signals for both upshifting and downshifting the transmission. In these systems, the upshift and downshift signals differ in some way. For example, in an analog system, a +6 volt signal may be used to signal an upshift operation, and a +3 volt signal may be used to signal a downshift operation. Alternatively, a +5 volt signal may be used to signal an upshift operation, and a −5 volt signal may be used to signal a downshift operation. In a digital system, multibit digital messages that address a particular device and specify the desired operation may be serially communicated on a single wire. In either case, complex calculations must be performed to determine the requested operation with accuracy. In the case of analog systems, the control signals may deteriorate as a result of moisture caused by riding in rain, riding through a puddle, etc.

SUMMARY OF THE INVENTION

The present invention is directed to various features of an apparatus for controlling a bicycle device. In one embodiment, a bicycle signal generating apparatus comprises an input unit and a signal generating unit. The input unit receives a first input signal and a second input signal, wherein the first input signal corresponds to a first operation of a bicycle device and the second input signal corresponds to a second operation of the bicycle device. The signal generating unit generates a first output signal having a first repeating pattern from the first input signal, and the signal generating unit generates a second output signal having a second repeating pattern from the second input signal. The first repeating pattern is different from the second repeating pattern.

In another embodiment, a bicycle signal generating apparatus again comprises an input unit and a signal generating unit. The input unit receives a first input signal and a second input signal, wherein the first input signal corresponds to a first operation of a bicycle device and the second input signal corresponds to a second operation of the bicycle device. The signal generating unit generates a first output signal from the first input signal and a second output signal from the second input signal. A time interval of the first output signal is based on a time interval of the first input signal, and the first output signal has a transition that occurs within an open interval defined by the time interval of the first input signal.

In another embodiment, a bicycle signal generating apparatus again comprises an input unit and a signal generating unit. The input unit receives a first input signal and a second input signal, wherein the first input signal corresponds to a first operation of a bicycle device and the second input signal corresponds to a second operation of the bicycle device. The signal generating unit generates a first output signal including a first pulse from the first input signal and a second output signal including a second pulse from the second input signal. A width of the first pulse is different from a width of the second pulse.

In another embodiment, a bicycle signal generating apparatus again comprises an input unit and a signal generating unit. The input unit receives a first input signal and a second input signal, wherein the first input signal corresponds to a first operation of a bicycle device and the second input signal corresponds to a second operation of the bicycle device. A time interval of the first input signal is different from a time interval of the second input signal. The signal generating unit generates a first output signal from the first input signal and a second output signal from the second input signal. A pattern of the first output signal is different from a pattern of the second output signal.

Additional inventive features will become apparent from the description below, and such features may be combined with any of the above features alone or in combination to provide additional benefits.

DETAILED DESCRIPTION OF THE EMBODIMENTS

Figure 1:
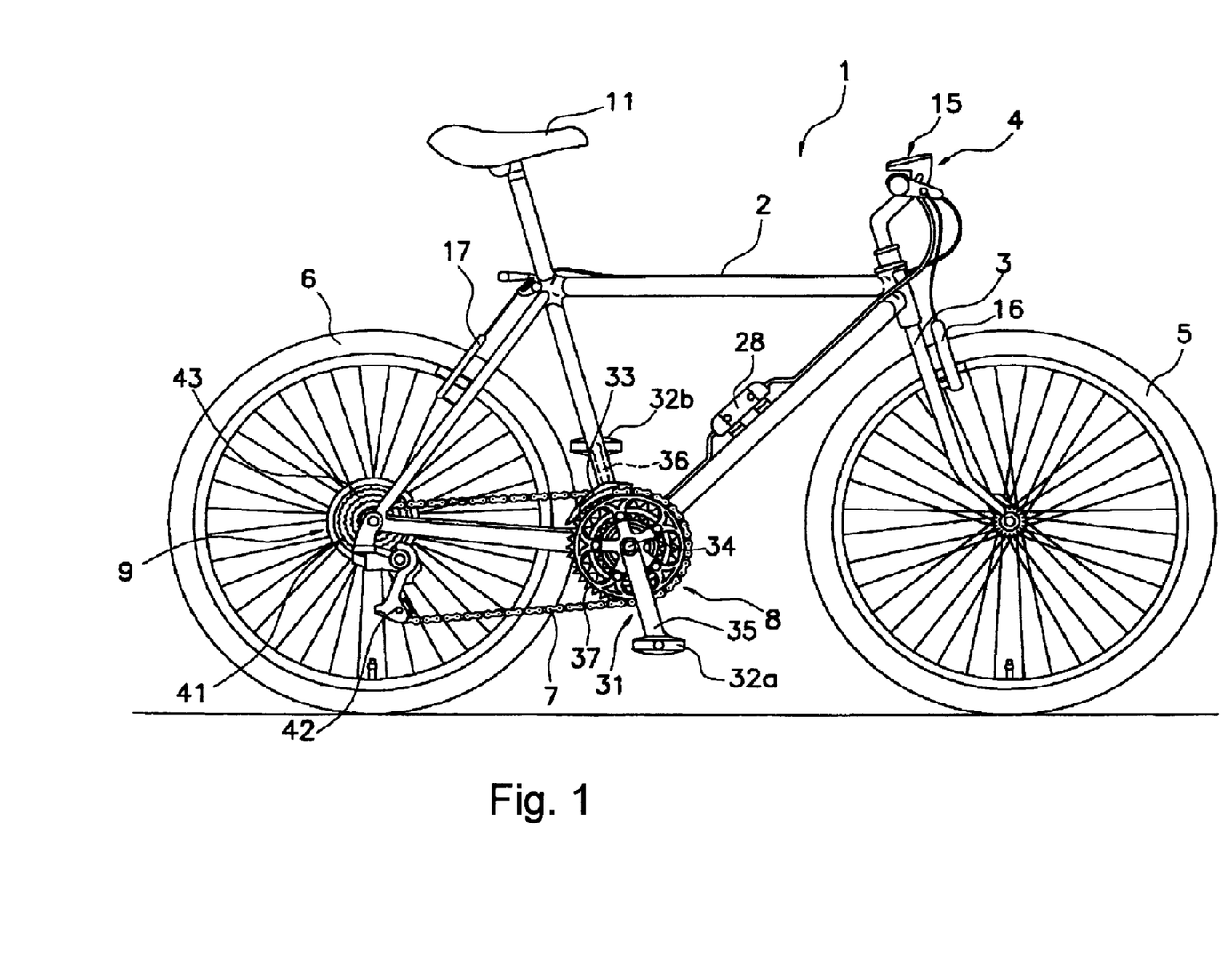
FIG. 1 is a side view of a bicycle that includes particular embodiments of electrically controlled bicycle transmissions.
Figure 2:
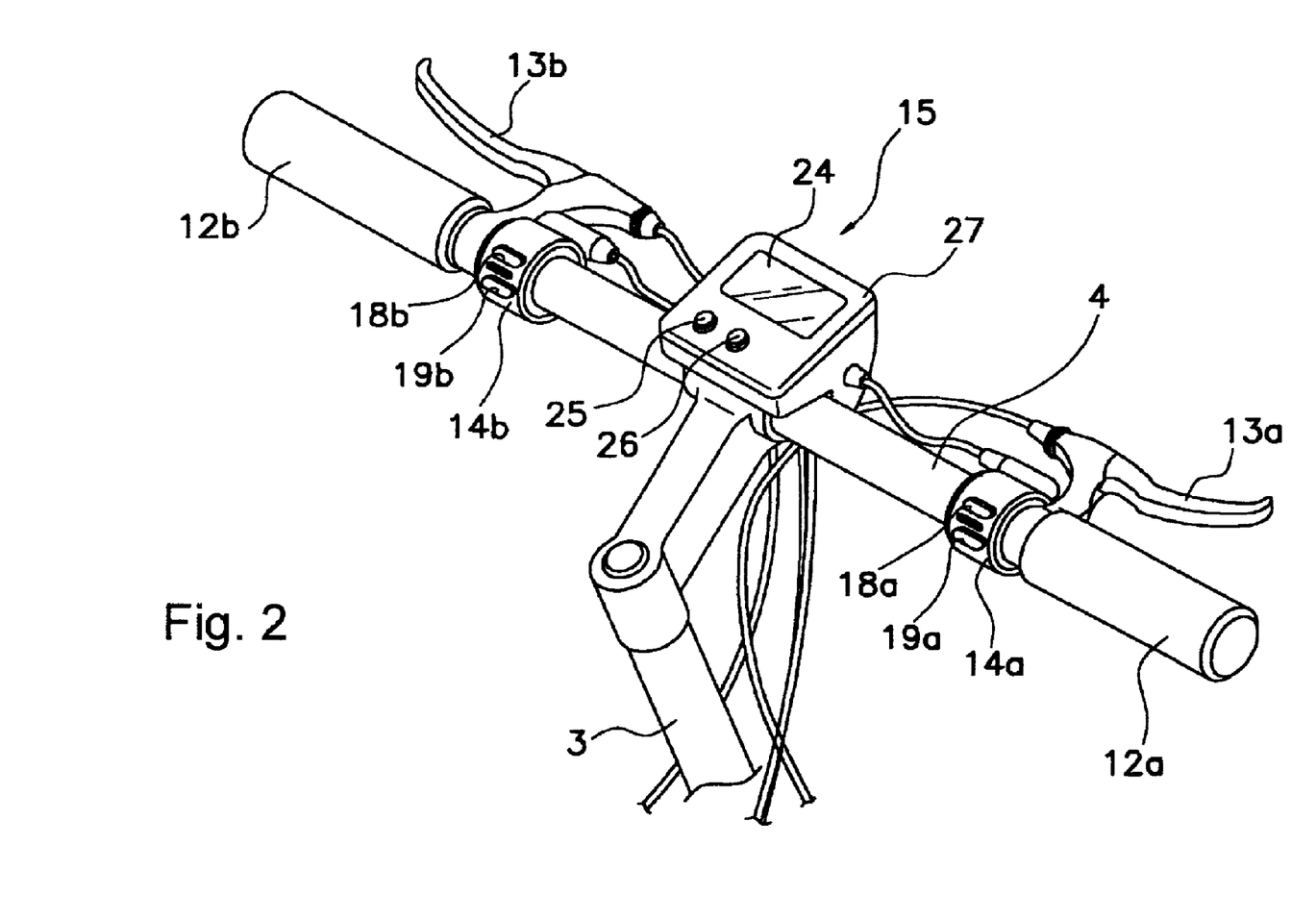
FIG. 2 is a detailed view of particular embodiments of handlebar mounted components of the bicycle shown in FIG. 1.

FIG. 1 is a side view of a bicycle that includes particular embodiments of electrically controlled bicycle transmissions. The bicycle 1 is a sport bicycle of a mountain bike type, and it comprises a frame 2, a front fork 3 rotatably mounted to frame 2, a handlebar assembly 4 mounted to the upper part of front fork 3, a front wheel 5 rotatably attached to the lower part of front fork 3, a rear wheel 6 rotatably attached to the rear of frame 2, a chain 7, a front transmission 8, a rear transmission 9, and a saddle 11. A front wheel brake 16 is provided for braking the front wheel 5, and a rear wheel brake 17 is provided for braking the rear wheel 6. As shown in FIG.

2, respective grips 12a, 12b and brake levers 13a, 13b are provided on both ends of handlebar assembly 4. Brake lever 13b is connected to the front wheel brake 16 for braking front wheel 5, and brake lever 13a is connected to the rear wheel brake 17 for braking rear wheel 6.

Front transmission 8 is a mechanical unit attached to the central lower part of frame 2 for transmitting drive force generated by the rider to rear transmission 9 via chain 7. Front transmission 8 comprises three sprockets 37 of various sizes and a front derailleur 33. The three sprockets 37 are installed on a gear crank 31 that rotates when the rider pushes pedals 32a and 32b. Gear crank 31 comprises a crankshaft 34 that passes horizontally and rotatably through the central lower part of frame 2, a right crank 35, and a left crank 36. One end of right crank 35 is connected to the right side of crankshaft 34, and the three sprockets 37 are attached to right crank 35. One end of left crank 36 is connected to the left side of crankshaft 34. The other ends of right crank 35 and left crank 36 rotatably support pedals 32a and 32b, respectively. Front derailleur 33 engages chain 7 with one of the three sprockets 37 and can be moved by a processor-controlled motor (not shown in the figures) that is controlled by a transmission control unit 15 described below. A front derailleur position sensor (not shown in the figures) detects the position of front derailleur 33 and hence the current speed step of front transmission 8.

Rear transmission 9 serves to transmit the driving force transmitted by chain 7 to rear wheel 6. Rear transmission 9 comprises a rear sprocket cluster 41 and a rear derailleur 42. In this embodiment, rear sprocket cluster 41 comprises seven sprockets 43 of different sizes that are mounted concentrically with the hub portion of rear wheel 6. Rear derailleur 42 engages chain 7 with one of the seven sprockets 43 and can be moved by a processor-controlled motor (not shown in the figures) that is controlled by transmission control unit 15. A rear derailleur position sensor (not shown in the figures) detects the position of rear derailleur 42 and hence the current speed step of rear transmission 9.

As shown in FIG. 2, shift command units 14a, 14b are provided inwardly of grips 12a, 12b and brake levers 13a, 13b, respectively. Transmission control unit 15 is attached to the central portion of handlebar assembly 4, and it is connected to shift command units 14a, 14b. Shift command units 14a, 14b are used for shifting front transmission 8 and rear transmission 9. A rear upshift button (switch) 18a and a rear downshift button (switch) 19a are provided in shift command unit 14a, and a front upshift button (switch) 18b and a front downshift button (switch) 19b are provided in shift command unit 14b. In this embodiment, upshift buttons 18a and 18b provide signals for upshifting front and rear transmissions 8 and 9 by one speed step. Similarly, downshift buttons 19a and 19b provide signals for downshifting front and rear transmissions 8 and 9 by one speed step.

Figure 3:
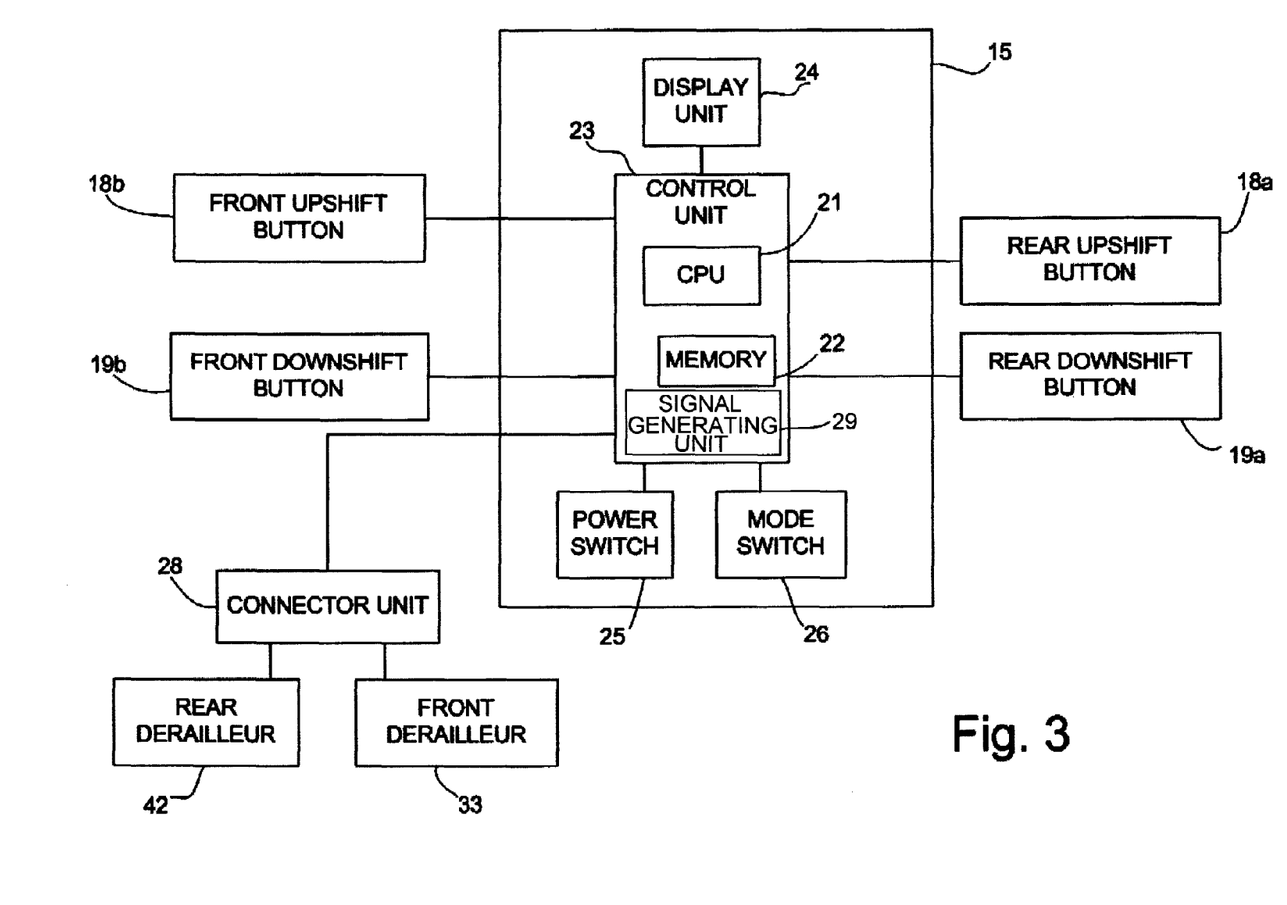
FIG. 3 is a block diagram of a particular embodiment of a control unit.

Transmission control unit 15 controls the operation of front transmission 8 and rear transmission 9 according to the signals provided by shift command units 14a and 14b. As shown in FIG. 3, transmission control unit 15, comprises a control unit 23, a display unit 24 for displaying the current speed step, a power switch 25, and a mode switch 26. Control unit 23 includes a CPU 21, a memory 22 and a signal generating unit 29. CPU 21 is a programmed processor that operates according to the information stored in memory 22. Signal generating unit 29 provides output signals to front derailleur 33 and rear derailleur 42 in response to input signals from shift command units 14a and 14b. Power switch 25 turns transmission control unit 15 on and off, and mode switch 26 changes an operating mode of transmission control unit 15. As shown in FIG. 2, transmission control unit 15 includes a box-like housing 27. Display unit 24, power switch 25, and mode switch 26 are arranged on the upper surface of housing 27. Transmission control unit 15 is connected to front transmission 8 and rear transmission 9 by a connector unit 28.

Figure 4A:
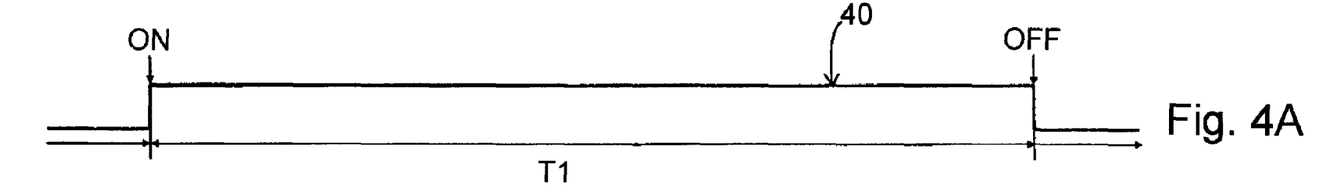
FIG. 4A is a timing diagram of an upshift signal provided by a manually operated upshift switch.
Figure 4B:
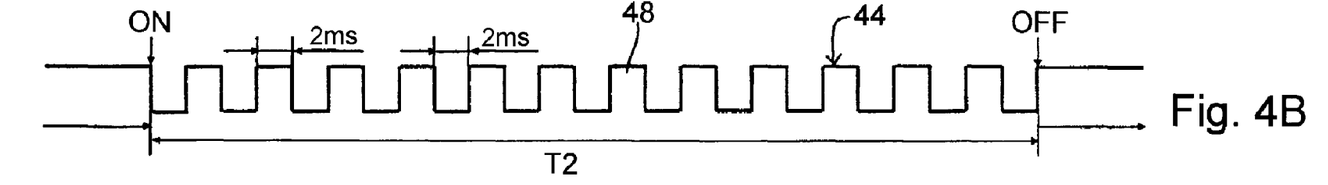
FIG. 4B is a timing diagram of an upshift signal provided by a signal generating unit.

FIG. 4A is a timing diagram of an upshift signal provided by rear upshift button 18a, and FIG. 4B is a timing diagram of an upshift signal provided by signal generating unit 29 in response to the operation of rear upshift button 18a. Similar signals may be generated in response to the operation of shift command unit 14b. As shown in FIG. 4A, pressing rear upshift button 18a for a time interval T1 provides a continuous high first input signal 40 during time interval T1. As shown in FIG. 4B, signal generating unit 29 generates a first output signal 44 from first input signal 40, wherein a time interval T2 of first output signal 44 is based on time interval T1 of first input signal 40. In this case, time interval T1 is the same as time interval T2, but the relationship may change depending upon the application. It should be noted that first output signal 40 has a transition (low to high or high to low) that occurs within an open interval defined by the time interval T1 of first input signal 40. In other words, at least one transition occurs sometime during time interval T1 excluding the endpoints of time interval T1. More specifically, first output signal 44 comprises a first pulse 48 that occurs within the open interval, and preferably a plurality of the first pulses 48 that form a first repeating pattern. In this embodiment, first pulses 48 have high and low pulse widths, each approximately 2 ms in time interval, and the pulse train continues for the entire duration of time interval T2 (e.g., as long as rear upshift button 18a is being pressed).

Figure 5A:
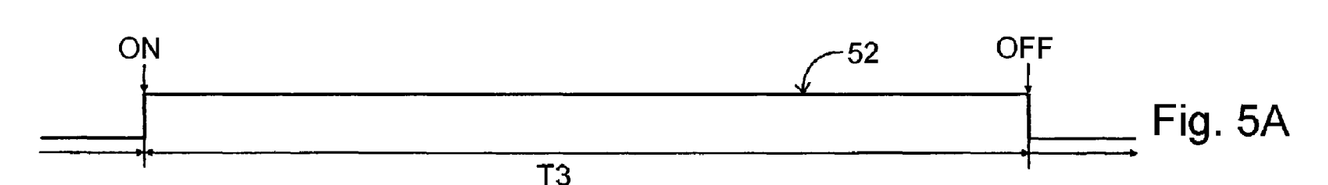
FIG. 5A is a timing diagram of a downshift signal provided by a manually operated downshift switch.
Figure 5B:
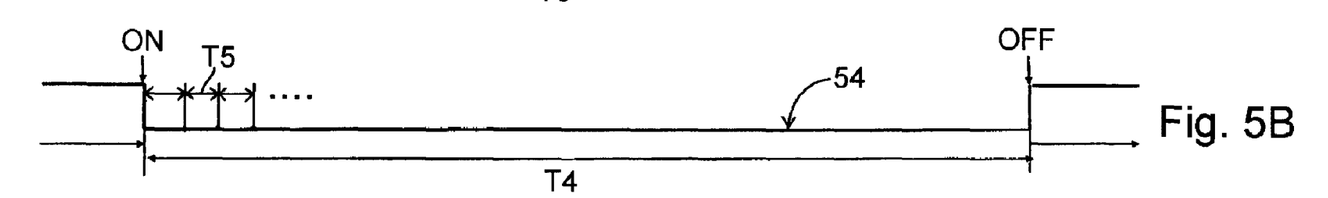
FIG. 5B is a timing diagram of a downshift signal provided by the signal generating unit.

FIG. 5A is a timing diagram of a downshift signal provided by rear downshift button 19a, and FIG. 5B is a timing diagram of a downshift signal provided by signal generating unit 29 in response to the operation of rear downshift button 19a. As shown in FIG. 5A, pressing rear downshift 19a button for a time interval T3 provides a continuous high second input signal 52 during time interval T3. As shown in FIG. 5B, signal generating unit 29 generates a second output signal 54 from second input signal 52, wherein a time interval T4 of second output signal 54 is based on time interval T3 of second input signal 52. In this case, time interval T3 is the same as time interval T4, but the relationship may change depending upon the application. It should be noted that, in this embodiment, unlike first output signal 44, second output signal 54 does not form a pulse within the open interval T3 defined by the time interval of second input signal 52. Instead, second output signal 54 is active low for a plurality of consecutive time intervals T5 (e.g., 2 ms each), thereby forming a repeating (continuous) pattern of low signals for the entire duration of time interval T4 (e.g., as long as rear downshift button 19a is being pressed).

Figure 6A:
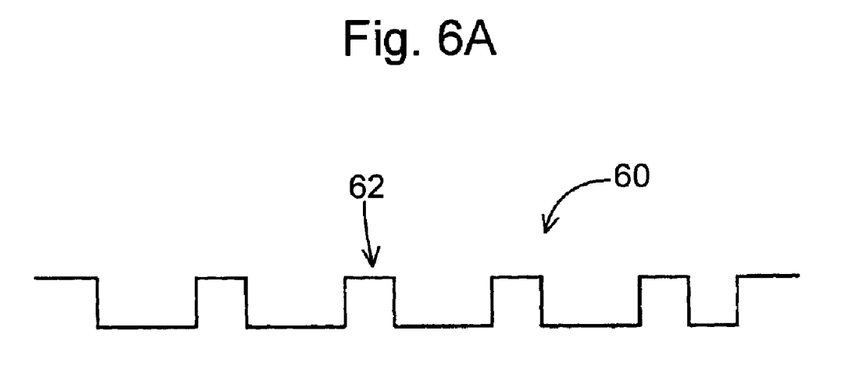
FIG. 6A is a timing diagram of an alternative embodiment of an upshift signal provided by the signal generating unit.
Figure 6B:
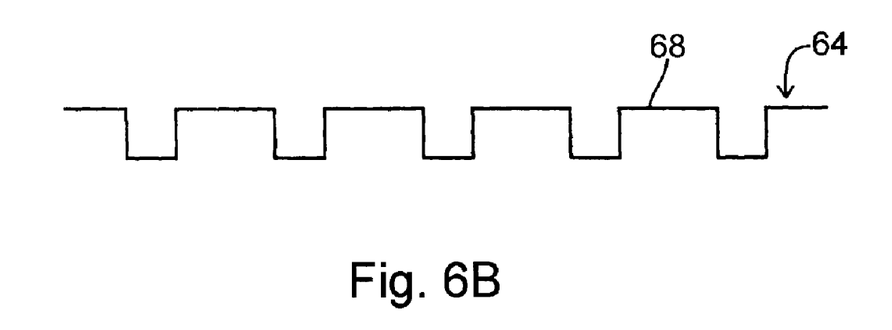
FIG. 6B is a timing diagram of an alternative embodiment of a downshift signal provided by the signal generating unit.

FIG. 6A is a timing diagram of an alternative embodiment of an upshift (first output) signal 60 provided by signal generating unit 29, and FIG. 6B is a timing diagram of an alternative embodiment of a downshift (second output) signal 64 provided by signal generating unit 29. In this embodiment, a time interval of upshift signal 60, wherein upshift signal 60 again comprises a plurality of upshift (first) pulses 62, also is based on a time interval of first input signal 40 and form a repeating pattern. However, the high and low pulse widths of upshift signal 60 are not the same. Instead, the high pulse widths are less than the low pulse widths. Of course, the high and low pulse widths may be changed to suit the application. In this embodiment, downshift signal 64 comprises a plurality of downshift (second) pulses 68 that form a repeating pattern.

However, a plurality of successive pulse widths of the same relative value of downshift signal 64 are different from a plurality of successive pulse widths of the same relative value of upshift signal 60. For example, the high pulse widths of downshift signal 64 are greater than the high pulse widths of upshift signal 60, and the low pulse widths of downshift signal 64 are less than the low pulse widths of upshift signal 60. In this embodiment, the repeating pattern of downshift signal 64 is an inversion of the repeating pattern of upshift signal 60, albeit shifted in phase.

Figure 7A:
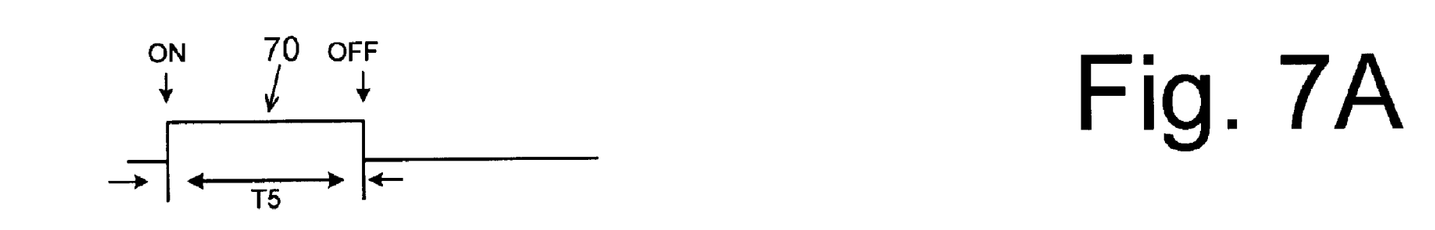
FIG. 7A is a timing diagram of a single upshift signal provided by the manually operated upshift switch.
Figure 7B:
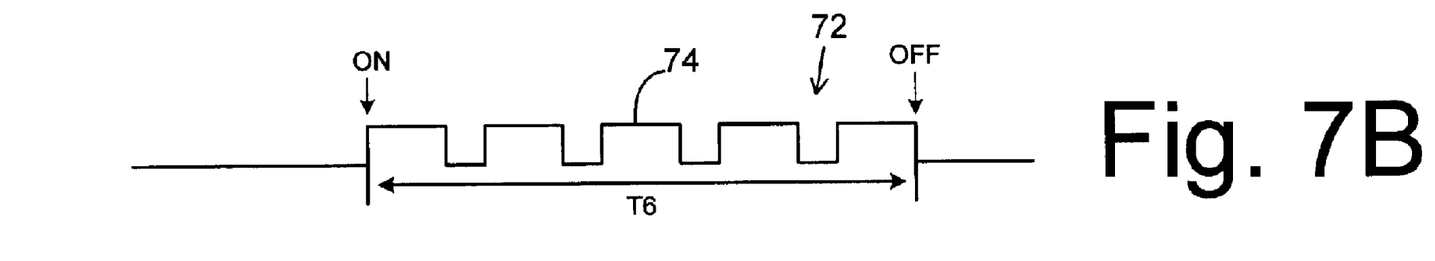
FIG. 7B is a timing diagram of a single upshift signal provided by the signal generating unit.
Figure 8A:
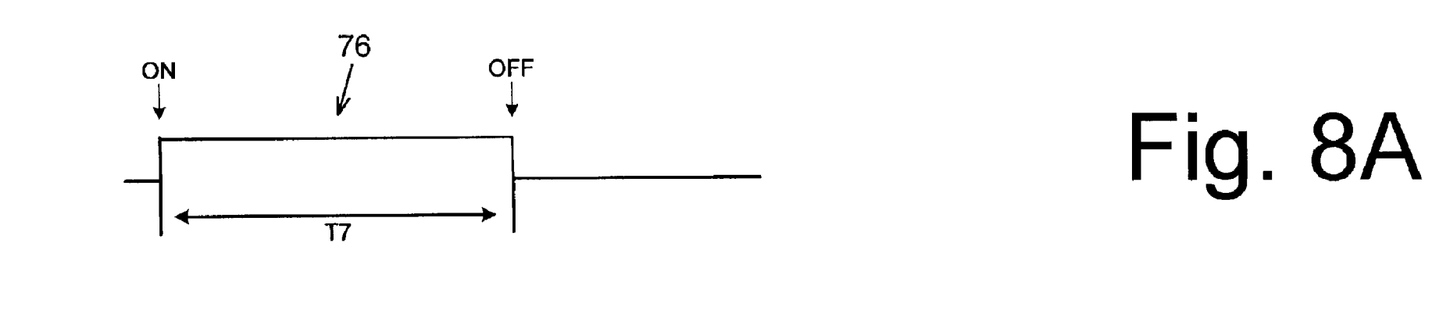
FIG. 8A is a timing diagram of a multiple upshift signal provided by the manually operated upshift switch.
Figure 8B:
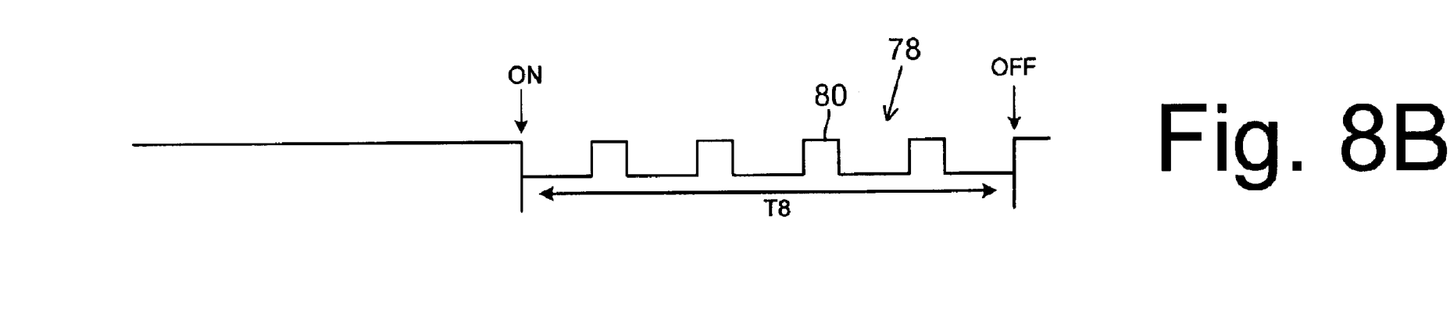
FIG. 8B is a timing diagram of a multiple upshift signal provided by the signal generating unit.

While the above is a description of various embodiments of inventive features, further modifications may be employed without departing from the spirit and scope of the present invention. For example, while signals commanding single upshifts and single downshifts were provided by the operation of buttons 18a, 18b, 19a and 19b, signals commanding multiple upshifts and/or multiple downshifts may be provided by the appropriate operation of buttons 18a, 18b, 19a and 19b. FIG. 7A is a timing diagram of a single upshift signal that may be provided by rear upshift button 18a, and FIG. 7B is a timing diagram of a single upshift signal that may be provided by signal generating unit 29, whereas FIG. 8A is a timing diagram of a multiple upshift signal that may be provided by rear upshift button 18a, and FIG. 8B is a timing diagram of a multiple upshift signal that may be provided by signal generating unit 29. Buttons 18b, 19a and 19b may operate conceptually in the same manner.

As shown in FIG. 7A, pressing rear upshift button 18a for a time interval T5 provides a continuous high first input signal 70 during time interval T5. As shown in FIG. 7B, signal generating unit 29 generates a first output signal 72 from first input signal 70 after first input signal 70 turns off, wherein a time interval T6 of first output signal 72 may or may not be based on a time interval T5 of first input signal 70. In this case, time interval T5 is less than time interval T6, but the relationship may change depending upon the application. As in the first embodiment, first output signal 72 comprises a plurality of first pulses 74.

On the other hand, as shown in FIG. 8A, pressing rear upshift button 18a for a time interval T7, which is different from (e.g., greater than) time interval T5, provides a continuous high second input signal 76 during time interval T7. As shown in FIG. 8B, signal generating unit 29 generates a second output signal 78 comprising a plurality of second pulses 80 from second input signal 76 after second input signal 76 turns off, wherein a time interval T8 of second output signal 78 may or may not be based on a time interval T7 of second input signal 76. In this case as well, time interval T7 is less than time interval T8, but the relationship may change depending upon the application. In any event, first output signal 72 has a different pattern than second output signal 78. That way, first output signal 72 can command a single upshift, whereas second output signal 78 can command a multiple upshift (e.g., by two gears). In this embodiment, second output signal 78 is an inversion of first output signal 72.

While signal generating unit 29 was located within transmission control unit 15, signal generating unit 29 could be placed within shift command units 14a and/or 14b or within some other structure, and control unit 21 may determine the requested operation based on the output signals. The signals provided by signal generating unit 29 need not comprise repeating patterns as long as one pattern is distinguishable from the other. While square and rectangular wave pulses were shown, other pulse configurations are possible. While the first and second output signals could be used to control front and rear derailleurs 33 and 42, the teachings herein could be applied to any electrically controlled bicycle device.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle signal generating apparatus comprising:
an input unit, wherein the input unit receives a first input signal that represents a first movement command and has a first time interval, wherein the input unit receives a second input signal that represents a second movement command and has a second time interval, wherein the first input signal corresponds to a first operation of a bicycle device from an origin position to a destination position, and wherein the second input signal corresponds to a second operation of the bicycle device from the origin position to a different destination position; and
a signal generating unit;
wherein the signal generating unit generates a first output signal having a first repeating pattern from the first input signal while the first input signal is being received;
wherein the signal generating unit generates a second output signal having a second repeating pattern from the second input signal; and
wherein the first repeating pattern is different from the second repeating pattern.

2. The apparatus according to claim 1 wherein the first repeating pattern repeats for an entire duration of the first time interval of the first input signal.

3. The apparatus according to claim 2 wherein the second repeating pattern repeats for an entire duration of the second time interval of the second input signal.

4. The apparatus according to claim 1 wherein the first repeating pattern comprises a plurality of first pulses.

5. The apparatus according to claim 4 wherein the second repeating pattern comprises a signal having substantially a same value for a plurality of consecutive time intervals.

6. The apparatus according to claim 4 wherein the second repeating pattern comprises a plurality of second pulses.

7. The apparatus according to claim 6 wherein the second repeating pattern comprises an inversion of the first repeating pattern.

8. The apparatus according to claim 6 wherein at least one of the plurality of second pulses has a different width than at least one of the plurality of first pulses.

9. The apparatus according to claim 6 wherein at least one of the plurality of second pulses has a different width than at least one of the plurality of first pulses with a same relative value.

10. The apparatus according to claim 1 wherein the first output signal corresponds to one of an upshift signal and a downshift signal for a bicycle transmission, and wherein the second output signal corresponds to the other one of the upshift signal or the downshift signal for the bicycle transmission.

11. The apparatus according to claim 1 further comprising:
a manually operated upshift switch that provides the first input signal to the input unit; and
a manually operated downshift switch that provides the second input signal to the input unit.

12. The apparatus according to claim 1 wherein a time interval of the first output signal is based on the first time interval of the first input signal; and
wherein the first output signal has a transition that occurs within a first open interval defined by the first time interval of the first input signal.

13. The apparatus according to claim 12 wherein the first output signal comprises a first pulse that occurs within the first open interval.

14. The apparatus according to claim 12 wherein the second output signal does not form a pulse within a second open interval defined by the second time interval of the second input signal.

15. The apparatus according to claim 14 wherein the second output signal comprises a signal having substantially a same value for a plurality of consecutive time intervals.

16. The apparatus according to claim 14 wherein the first output signal comprises a first pulse that occurs within the first open interval.

17. The apparatus according to claim 14 wherein the first output signal comprises a plurality of first pulses that occur within the first open interval.

18. The apparatus according to claim 17 wherein the plurality of first pulses form the first repeating pattern.

19. The apparatus according to claim 12 wherein the first output signal comprises a plurality of first pulses that occur within the first open interval.

20. The apparatus according to claim 19 wherein the plurality of first pulses form the first repeating pattern.

21. The apparatus according to claim 19 wherein the second output signal comprises a plurality of second pulses.

22. The apparatus according to claim 21 wherein the second output signal comprises an inversion of the first output signal.

23. The apparatus according to claim 21 wherein at least one of the plurality of second pulses has a different width than at least one of the plurality of first pulses.

24. The apparatus according to claim 12 wherein the first output signal corresponds to one of an upshift signal or a downshift signal for a bicycle transmission, and wherein the second output signal corresponds to the other one of the upshift signal or the downshift signal for the bicycle transmission.

25. The apparatus according to claim 12 further comprising:
a manually operated upshift switch that provides the first input signal to the input unit; and
a manually operated downshift switch that provides the second input signal to the input unit.

26. A bicycle signal generating apparatus comprising:
an input unit that receives a first input signal having a first time interval and a second input signal having a second time interval, wherein the first input signal corresponds to a first operation of a bicycle device, and wherein the second input signal corresponds to a second operation of the bicycle device; and
a signal generating unit;
wherein the signal generating unit generates a first output signal including a first pulse from the first input signal, wherein a length of a time interval of the first output signal is based on a length of a time interval of the first input signal;
wherein the signal generating unit generates a second output signal including a second pulse from the second input signal, wherein a length of a time interval of the second output signal is based on a length of a time interval of the second input signal; and
wherein a width of the first pulse is different from a width of the second pulse.

27. A bicycle signal generating apparatus comprising:
an input unit that receives, from a same single switch, a first input signal having a first time interval and a second input signal having a second time interval, wherein the first input signal corresponds to a first operation of a bicycle device, wherein the second input signal corresponds to a second operation of the bicycle device, and wherein the first time interval of the first input signal is different from the second time interval of the second input signal; and
a signal generating unit;
wherein the signal generating unit generates a first output signal from the first input signal;
wherein the signal generating unit generates a second output signal from the second input signal; and
wherein a pattern of the first output signal is different from a pattern of the second output signal.

28. The apparatus according to claim 27 wherein the first output signal comprises a plurality of first pulses, and wherein the second output signal comprises a plurality of second pulses.

29. The apparatus according to claim 27 wherein the first output signal corresponds to a single shift of a bicycle transmission, and wherein the second output signal corresponds to a multiple shift of the bicycle transmission.

30. The apparatus according to claim 26 wherein the bicycle device comprises:
a manually operated upshift switch that provides the first input signal to the input unit; and
a manually operated downshift switch that provides the second input signal to the input unit.

31. The apparatus according to claim 27 wherein a length of the first time interval of the first input signal is different from a length of the second time interval of the second input signal.

* * * * *